July 29, 1958     C. E. RAY     2,845,040
BREADING MACHINE

Filed Oct. 5, 1955     2 Sheets-Sheet 1

INVENTOR
CLYDE RAY
BY *[signature]*
ATTORNEY

July 29, 1958   C. E. RAY   2,845,040
BREADING MACHINE
Filed Oct. 5, 1955   2 Sheets-Sheet 2
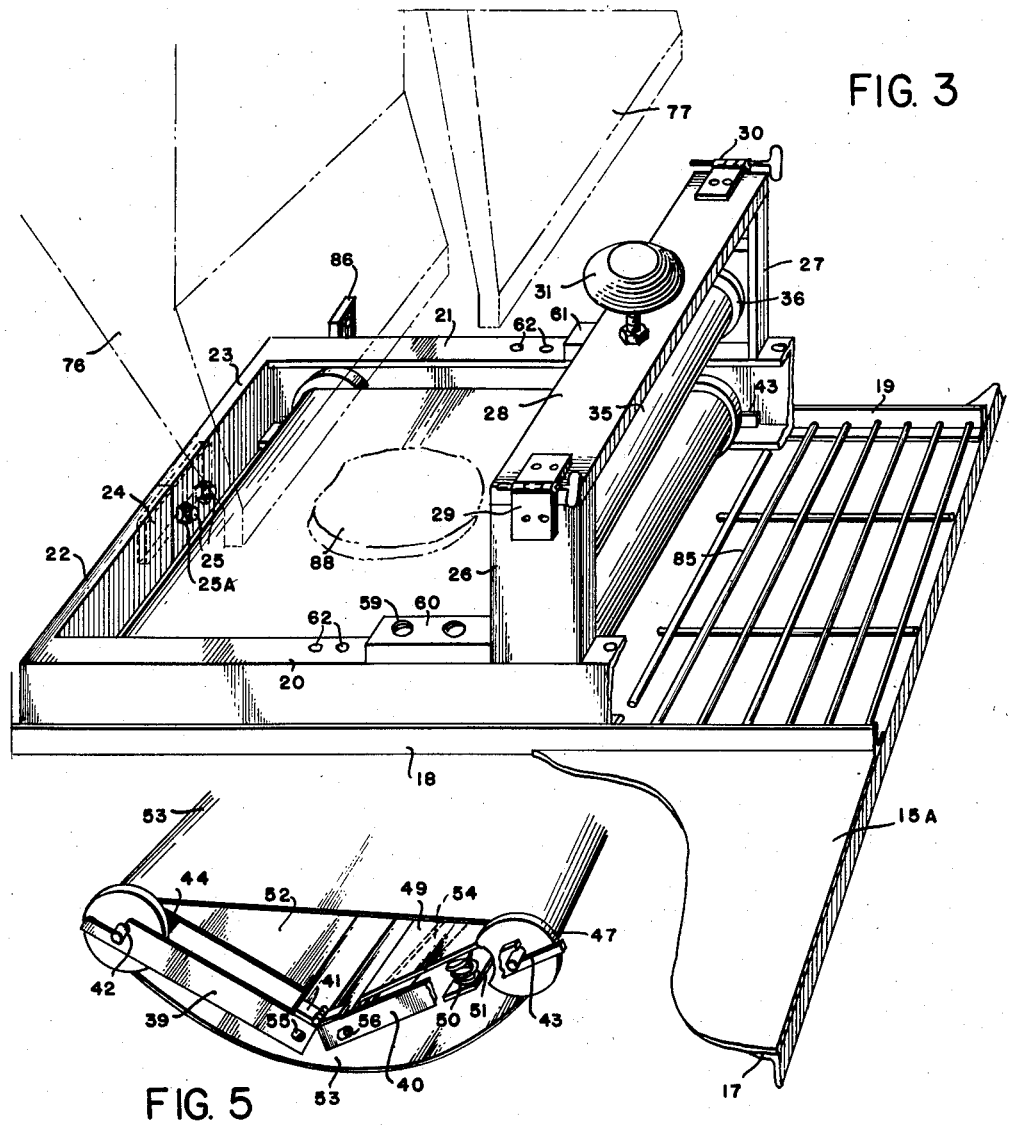
FIG. 3
FIG. 5
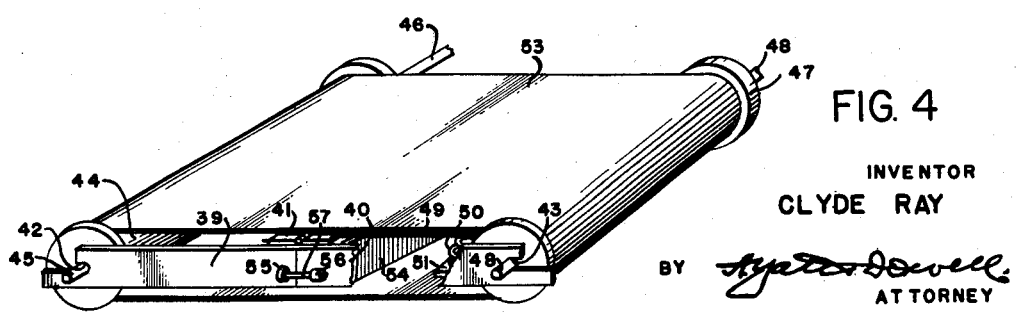
FIG. 4
INVENTOR
CLYDE RAY
BY
ATTORNEY

United States Patent Office 2,845,040
Patented July 29, 1958

2,845,040

BREADING MACHINE

Clyde Elbert Ray, Kokomo, Ind.

Application October 5, 1955, Serial No. 538,585

2 Claims. (Cl. 118—13)

The present invention relates to the preparation of food and more particularly to a machine for applying particulate material such as bread crumbs to edible food such as meat, seafood, and vegetables or the like preparatory to the cooking operation.

Heretofore, various devices and processes have been used to apply crumbs to the surfaces of edible articles such as steaks or the like, but the previously known devices and machines have been excessively expensive and complicated and, therefore, have not met with general approval and hand methods of applying crumbs have been used almost entirely in small restaurants including "drive-ins." However, the hand application of crumbs has not been uniform and has also required an excessive amount of time of expensive labor and, therefore, restaurants have not been able to keep up with trade and have not been able to fill orders with sufficient speed to satisfy the customers and to insure a profit.

An object of the present invention is to overcome the defects of the previously used methods and machines and to provide an apparatus which will be readily available and can be operated by relatively unskilled help.

A further object of the invention is to provide equipment which will have a minimum of upkeep while being efficient for the purpose of applying crumbs or other particulate material to articles such as food or the like.

Another object of the invention is to provide a belt conveyor for receiving articles with provision for ready replacement and cleaning of the belt.

A further object is to provide readily useable equipment which may be dissembled with minimum effort for cleaning and repair to maintain the food treating equipment in sterile and sanitary condition.

Figure 1:
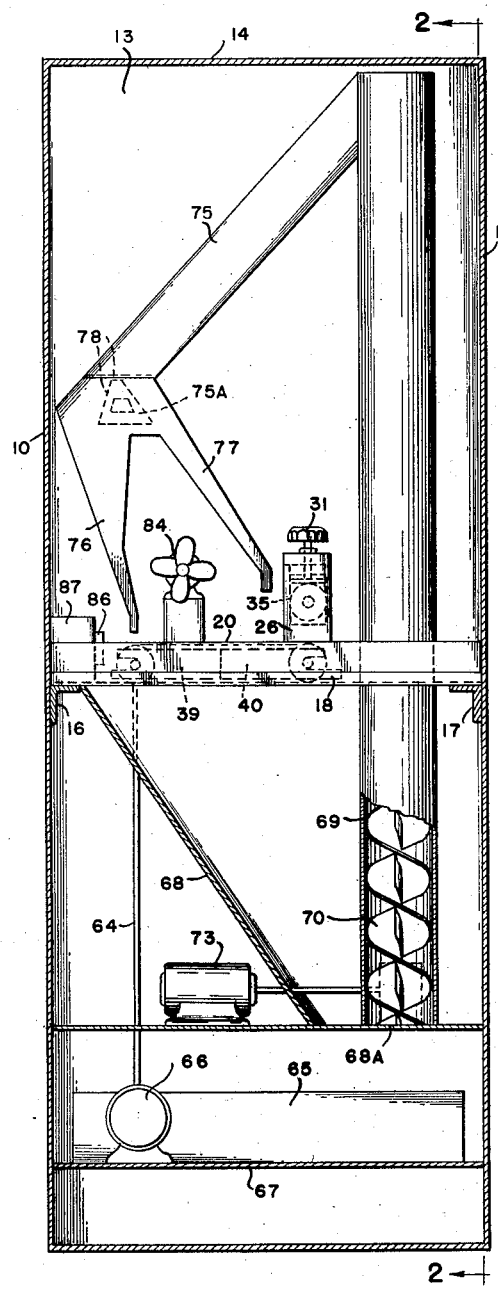
Figure 2:
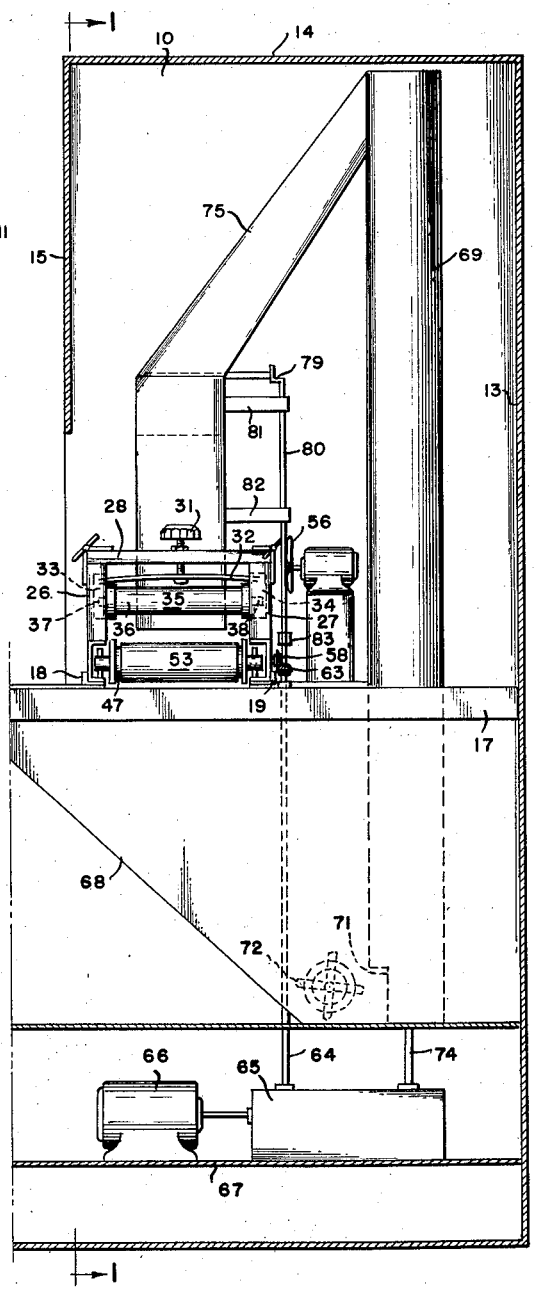

Other and further objects will be apparent as the description proceeds and upon reference to the accompanying drawings wherein:

Fig. 1 is a section taken on line 1—1 of Fig. 2 of the bread crumb applying machine and its housing with the front walls omitted showing the complete organization;

Fig. 2, a side elevation taken on line 2—2 of Fig. 1 with the right side wall omitted and a portion of the front of the housing broken away;

Fig. 3, a fragmentary perspective of the bread crumbing device on an enlarged scale with parts omitted and parts shown in phantom illustrating the operation and use of the machine;

Fig. 4, a perspective with parts broken away of a belt conveyor assembly removed from the housing but with the parts of the belt conveyor in operative position; and Fig. 5, a fragmentary perspective with the framework of the belt conveyor in jackknifed condition to permit replacement of the conveyor belt.

Briefly, the present invention comprises a housing with a bread crumb receiving hopper in the bottom portion thereof and a pair of transversely extending angles supported on ledges in the housing with the angles supporting a framework formed of a pair of horizontally positioned channels arranged in spaced parallel relation with the channels facing one another and with the channels mounted on said angle members. A pair of upstanding channel shaped columns project upwardly from one of the ends of the channels guides bearing blocks in which a pressing roller is rotatably mounted, the bearing blocks being urged downwardly by a spring that is moved by a hand operated screw, threaded through a transom extending between the channel shaped columns. A belt conveyor assembly including a pair of U-shaped frames hingedly connected together at their bight portions and carrying rolls at their outer ends over which a conveyor belt passes is mounted in the channel members and driven by suitable means with one of the rollers of the conveyor underlying the pressing roller. An elevating conveyor extends from the bottom of the hopper upwardly and carries crumbs from the hopper to the upper end of a downwardly extending chute having two branches, one branch discharging adjacent the incoming side of the belt conveyor and the other branch discharging adjacent the discharge end of the belt conveyor which is adjacent the incoming side of the presser roller. The crumbs are applied to the conveyor forming a bed of crumbs and the article is then placed on the bed. Crumbs are then applied to the top of the article, and the crumb coated article is then pressed between the presser roller and the conveyor so the crumbs are retained in position on the article and the crumbed article is cooked or packaged or receives other treatment.

The machine of the present invention includes a housing having side walls 10 and 11 of L-configuration, a back wall 13, a top wall 14, an upper front wall 15 and a lower front wall (not shown). A pair of opposed ledges 16 and 17 are mounted on the side walls 10 and 11 of the housing by any suitable means. A pair of angle shaped stringers, 18 and 19, arranged in space parallel relation extend between and are supported on the opposed ledges 16 and 17, being secured thereto by any suitable means such as bolts, rivets, or the like.

A machine for removable mounting on the angle shaped stringers comprises a framework having channels 20 and 21, arranged in substantially parallel horizontally disposed relation with the channel facing one another. Laterally extending straps 22, 23, are secured to one end of the channels and are connected together by a plate 24 fixed to the strap 22 and removably secured to the strap 23 by means of bolts 25, passing through apertures in strap 23 secured by nuts 25A to maintain the channels in proper spaced relation.

A pair of upstanding channel shaped columns 26, 27 are secured to and project upwardly from the other end of said first mentioned channels 20, 21 respectively. A transom 28 is removably connected to the upper ends of the columns 26, 27, by suitable positive intergaging means such as hinges 29 and 30, such hinges having removable hinge pins to permit complete separation of the transom from the columns.

A hand screw 31, threaded through the transom 28, and pivotally secured to a leaf spring 32, provides for vertical adjustment of such leaf spring. Bearing blocks 33, 34, slidably mounted in the channel columns 26, 27 respectively are secured to the outer ends of the leaf spring 32, by any suitable means to provide for vertical adjustment of such bearing blocks, the leaf spring preferably being received in sockets or apertures in the bearing blocks for positive connection therewith. A presser roller 35 having flanges 36 at its ends is rotatively mounted in the bearing blocks 33, 34, by means of outwardly projecting stub shafts 37, 38, integral with the roller 35 and which are received in bearing recesses in the bearing blocks thereby providing free rotation of the presser roller 35.

A belt conveyor assembly, including a pair of U-shaped members 39 and 40, pivotally connected together by hinges 41, 41 at their bight portions are provided with outwardly opening journal receiving recesses 42, 42, and 43, 43 in the outer ends of each. A roller 44, having flanges at its ends, a stub shaft 45 at one end, and a driving stub shaft 46 on the other end, is rotatably mounted in the journal receiving recesses 42, 42, of the frame 39. A second flanged conveyor supporting roller 47, has stub shaft 48, 48 rotatably mounting the roller in the journal receiving recesses 43, 43, of the U-shaped frame 40.

A pressure plate 49 is hingedly connected to the bight portion of the U-shaped frame 40, and is urged upwardly by a pair of springs 50, 50, which are mounted on a transverse strut 51, extending between the legs of the U-shaped frame 40, and pressing on the lower surface of the pressure plate 49, urging such pressure plate upwardly. A shield 52 mounted on the bight portion of the U-shaped frame 39, extends rearwardly therefrom to support the upper run of the belt 53 in flat condition, the hinges 41 being outside of the path of the belt 53, and the hinged connection of the pressure plate 49, lying below the upper surface of the plate 49 resulting in a smooth belt supporting structure when the belt is in operative position.

A scraper blade 54, extends diagonally between the legs of the U-shaped frame member 40 for contacting the lower run of the belt 53, in order to scrape material from the belt. As viewed in Figs. 1, 3, 4, and 5 of the drawings, the upper run of the belt moves to the right carrying the article 88 under the presser roller 35. The U-shaped frame members 39 and 40 are adapted to assume a jack-knife position shown in Figure 5 to permit application of and removal of the endless belt 53, and such U-shaped frame members are held in an operative position shown in Figures 1 to 4 inclusive by means of lugs 55, 56, through which a bolt 57 passes and secures such lugs together maintaining the U-shaped frame members in operative position, similar lugs and bolts being provided on both sides, if desired.

The conveyor belt assembly including the U-shaped frame 39, 40, the rollers 44, 47 and the belt 53, is mounted in the channels of channel members 20 and 21, with the driving stub shaft 46 projecting through an aperture in the channel member 21, such stub shaft having a bevelled gear 58 detachably fixed thereto for driving the conveyor belt 53. The belt conveyor roller 47 is positioned adjacent the presser roller 35, and the clearance between the presser roller 35 and the conveyor 53 is obtained by hand screw 31, and other adjustment may be obtained by moving the vertically extending channel shaped columns 26, 27 along the channel members 20 and 21 respectively, the bolts 59 being removable from brackets 60, 61, which secure the columns in position, such bolts 59 being received in one of the rows of threaded apertures 62 in the channel members 20, 21 in order that longitudinal adjustment of columns 26, 27 and of the pressure roller 35 may be obtained thereby providing for additional adjustment between the conveyor belt and the presser roller.

The conveyor driving gear 58 is driven from another gear 63, fixed on a shaft 64 mounted in suitable bearings supported from the angle member 19, the shaft 64 being driven from a gear box 65 which receives its power from a motor 66, which along with gear box 65 are mounted on a supporting shelf 67. The housing is provided with a hopper 68, which underlies angle shaped stringers 18 and 19, and the machine supported thereon for receiving the bread crumbs or other particulate material, the hopper being of a design having its walls converging downwardly and provided with a bottom 68A, from which an upstanding screw conveyor including a casing 69 and a screw 70 raises particulate material, the casing 69 having an opening 71 at the bottom thereof, and the material being urged into the opening by means of a paddle wheel, which is driven from a motor 73. The screw 70 of the screw conveyor is driven from a shaft 74, driven from the gear box 65.

From the upper end of the screw conveyor casing 69, a chute 75 extends downwardly and has two branches 76 and 77, the branch 76 having its discharge end adjacent the infeeding end of the belt conveyor 52 and the branch 77 having its discharge end adjacent the discharge end of the belt conveyor and the adjacent presser roller 35.

A screen 78 is slidably mounted in the chute 75 above a baffle 75A and is vibrated by any suitable means such as a crank 79, on a shaft 80, which shaft is rotatably mounted in bearing supports 81, 82, or the like, the lower end of shaft 80 being connected to an upward extension of shaft 64, by means of a coupling 83 of any suitable design.

A fan 84 may be provided for circulating air in the housing to prevent dust from passing outside of the housing and such fan may be connected to a porous bag or the like in a manner similar to a vacuum cleaner to remove such dust or the current of air produced by such fan may serve to remove the dust and cause the dust to settle in and be returned to the hopper.

The assembly including channel members 20, 21, with upstanding columns 26 and 27 and the conveyor belt assembly are retained on angle shaped stringers 18 and 19 by means of a bracket 86, secured to the channel member 21, and such bracket 86 being secured to a block or the like 87, fixed on the angle member 19 and/or to the housing of the machine thereby assuring proper positioning of the parts and good driving relation of the gears by permitting dissembly of the machine.

A grating 85 is mounted in the angle shaped stringers 18 and 19 to provide for receiving articles passing over the conveyor and under the presser roll.

From the above description it is believed that operation of the machine should be apparent. Crumbs or other particular material are placed in the hopper 68 and after the motors are started such crumbs are raised by the screw 70 and dropped into the chute 75, from which the crumbs drop onto the vibrating screen 78, and discharged through branch 76 on to the conveyor belt 53, thereby providing a bed of crumbs on such conveyor belt. The article such as meat 88 or the like to be breaded is placed on the bed of crumbs, moved by the conveyor under the discharge end of the branch chute 77 which drops crumbs onto the upper surface of the article 88, which now has bread crumbs in contact with both of its surfaces, the crumbs being pressed between the roller 35 and the belt 53, which is supported by the roller 47 and the pressure plate 49, producing the proper pressure to press the crumbs into the meat or article, thereby assuring complete coverage of such article with the crumbs. The article is then discharged onto the grating 85 or onto the hand of the waiting operator, who removes the breaded article in order that it may be cooked in the usual manner.

It will be apparent to those skilled in the art that various changes may be made in the invention without departing from the spirit and the scope thereof and therefore the invention is not limited by that which is shown in the drawings and described in the specification but only as indicated in the appended claims.

What is claimed is:

1. A machine for applying crumbs to an article of food comprising a framework having two channels arranged in substantially opposed relation with the channels facing one another, means to detachably connect the channels at one end, a pair of upstanding channel shaped columns projecting upwardly from the other end of said first-mentioned channels, a transom removably connected to the upper ends of said columns, a hand screw threaded through said transom and rotatably secured to a leaf spring extending into both of said columns, a bearing block in each of said columns connected to said spring, a presser roller having flanges at its ends rotatably mounted in said bearing blocks, a belt conveyor assembly including a pair of U-shaped frame members pivotally connected together by their bight portions, outwardly opening journal receiving recesses in the outer ends of the said U-shaped frame, a flanged roller rotatably mounted in the bearing recesses of each U-shaped frame, a pressure plate pivotally mounted to the bight portion of one U-shaped frame, a transverse member extending between the legs of said one of said U-shaped frame, a pair of springs on said transverse member urging said pressure plate out of the plane of said U-shaped frame, a shield mounted on the other U-shaped frame, a scraper extending diagonally of the legs of said one U-shaped frame and extending downwardly therefrom, a conveyor belt mounted on said rollers on said U-shaped frames and adapted to contact said pressure plate, shield and scraper, means to maintain said U-shaped frames in one plane, said U-shaped frames with the conveyor being receivable in the inwardly facing channels of said framework with one of said rollers adapted to be positioned under the presser roller mounted in said columns, an extension of a journal from the other of said conveyor rollers and projecting through said framework and having a gear thereon, a shaft having a gear cooperating with the gear of said journal extension, means to rotate said shaft and thereby said conveyor, a cabinet having a pair of supporting ledges therein, a pair of angle members arranged in spaced parallel relation between said ledges for receiving said first mentioned channel framework, a hopper located below said angle members and adapted to receive particulate material, an upwardly extending screw conveyor for raising material from the bottom of said hopper upwardly, a chute extending from the upper end of said screw conveyor, having a pair of branches, one branch having its discharge adjacent the feed end of said belt conveyor, and the other branch having its discharge adjacent the discharge end of said belt conveyor, a screen mounted in said chute, means to vibrate said screen, means to urge particulate material into said screw conveyor, air circulating means for removing dust, and a grating mounted on said angle members adjacent the discharge end of said belt conveyor for receiving articles covered with said particulate material.

2. A machine for applying crumbs to an article of food comprising a framework having two channels arranged in substantially opposed relation with the channels facing one another, means to detachably connect the channels at one end, a pair of upstanding channel shaped columns projecting upwardly from the other end of said first-mentioned channels, a transom removably connected to the upper ends of said columns, a hand screw threaded through said transom and rotatably secured to a leaf spring extending into both of said columns, a bearing block in each of said columns connected to said spring, a presser roller having flanges at its ends rotatably mounted in said bearing blocks, a belt conveyor assembly including a pair of U-shaped frame members pivotally connected together by their bight portions, outwardly opening journal receiving recesses in the outer ends of the said U-shaped frame, a flanged roller rotatably mounted in the bearing recesses of each U-shaped frame, a pressure plate pivotally mounted to the bight portion of one U-shaped frame, a transverse member extending between the legs of said one of said U-shaped frame, a pair of springs on said transverse member urging said pressure plate out of the plane of said U-shaped frame, a shield mounted on the other U-shaped frame, a scraper extending diagonally of the legs of said one U-shaped frame and extending downwardly therefrom, a conveyor belt mounted on said rollers on said U-shaped frames and adapted to contact said pressure plate, shield and scraper, means to maintain said U-shaped frames in one plane, said U-shaped frames with the conveyor being receivable in the inwardly facing channels of said framework with one of said rollers adapted to be positioned under the presser roller mounted in said columns, an extension of a journal from the other of said conveyor rollers and projecting through said framework and having a gear thereon, a shaft having a gear cooperating with the gear of said journal extension, means to rotate said shaft and thereby said conveyor.

References Cited in the file of this patent

UNITED STATES PATENTS

| | | |
|---|---|---|
| 787,274 | Burns | Apr. 11, 1905 |
| 2,149,927 | Pellar | Mar. 7, 1939 |
| 2,440,655 | Hahn | Apr. 27, 1948 |
| 2,659,338 | Harrison | Nov. 17, 1953 |
| 2,659,339 | Harrison | Nov. 17, 1953 |
| 2,716,608 | Renish | Aug. 30, 1955 |
| 2,731,942 | Anderson | Jan. 24, 1956 |